US006673419B1

(12) United States Patent
Mori

(10) Patent No.: US 6,673,419 B1
(45) Date of Patent: Jan. 6, 2004

(54) MARKING FILM AND COMPOSITE MARKING FILM

(75) Inventor: Yutaka Mori, Hachioji (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/936,085

(22) PCT Filed: Feb. 22, 2000

(86) PCT No.: PCT/US00/04567

§ 371 (c)(1), (2), (4) Date: Sep. 6, 2001

(87) PCT Pub. No.: WO00/54980

PCT Pub. Date: Sep. 21, 2000

(30) Foreign Application Priority Data

Mar. 12, 1999 (JP) ............................................ 11-67138

(51) Int. Cl.[7] ............................ B32B 3/00; B32B 7/02; B32B 33/00; B32B 9/00; B32B 15/04

(52) U.S. Cl. ...................... 428/174; 428/195; 428/40.1; 428/215; 428/354; 428/343; 428/29; 428/913; 428/914; 428/214

(58) Field of Search ................................ 428/174, 195, 428/40.1, 215, 354, 913, 914, 29, 343, 214

(56) References Cited

U.S. PATENT DOCUMENTS 4,207,372 A * 6/1980 Sahara ....................... 428/220
4,343,856 A * 8/1982 Goswami et al. ........... 428/332
4,648,689 A * 3/1987 May ........................... 359/538
5,082,715 A * 1/1992 Lasch et al. ................ 428/143
5,087,148 A * 2/1992 Wyckoff ...................... 404/12
5,160,778 A * 11/1992 Hashimoto et al. ......... 428/195
5,209,959 A * 5/1993 McNaul et al. ............ 428/40.6
5,453,320 A * 9/1995 Harper et al. ............... 428/356
5,536,569 A * 7/1996 Lasch et al. ................ 428/328
5,736,228 A * 4/1998 Morris et al. ............... 428/195
5,874,158 A * 2/1999 Ludwig et al. ............. 428/195
5,895,801 A * 4/1999 Lee ............................ 525/301

FOREIGN PATENT DOCUMENTS

EP 0973651 11/2001
JP 6-51702 2/1994
JP 7-138540 5/1995
JP 07138540 A * 5/1995 ............. B44C/1/17
JP 09057890 A * 3/1997 ............. B32B/7/06
JP 10-287849 10/1998
NL 8000910 2/1980
WO WO95-18720 7/1995
WO WO96-11116 4/1996

* cited by examiner

*Primary Examiner*—Harold Pyon
*Assistant Examiner*—Catherine A. Simone
(74) *Attorney, Agent, or Firm*—Jean A. Lown; Harold C. Knecht, III

(57) ABSTRACT

A marking film exhibiting good ability for tracing curved surfaces when it is to be stuck to steeply curved three-dimensional portions without entrapping air bubbles at the film edges when an over-clear coating is applied thereon after it has been stuck. The marking film has a marking component to be transferred onto an article via an adhesive layer, wherein the total thickness of the marking film is in the A range of from about 50 μm to about 300 μm, and the modulus of elasticity thereof is in the range of from about 2 $kgf/mm^2$ to about 25 $kgf/mm^2$ as measured under a condition where the marking film is elongated at a tension speed of 300 mm/min. into an elongation percentage in the range of 0 to about 10%.

10 Claims, 3 Drawing Sheets

MARKING FILM AND COMPOSITE MARKING FILM

FIELD OF THE INVENTION

The present invention relates to a marking film. More specifically, the invention relates to an improved marking film which can be transferred and adhered onto articles having rugged surfaces and steeply curved three-dimensional surfaces, favorably and with ease, without developing poor appearance caused by the entrapment of air bubbles at the ends of the film when an over-clear coating is applied onto the marking film. The invention also relates to a composite marking film comprising a combination of the marking film and the application film, exhibiting excellent effects of the marking film and enhancing the workability. The invention, therefore, can be advantageously used for adhering the marking film having a predetermined shape or ornament appeal (hereinafter referred to as "marking component") onto articles such as automobiles, motorcycles, etc. and onto any other articles.

BACKGROUND

In order to assist the operation for transferring and adhering a marking film onto an article having curved surfaces and rugged portions, there have heretofore been used various types of transfer-assisting members called application films or application tapes. Japanese Unexamined Patent Publication (Kokai) No. 6-51702 discloses an application tape which can be transferred onto a desired article by peeling an ornamental adhesive sheet of a predetermined shape off a peel member, the base member of the tape having a 2% modulus value of 3 to 4 kg/15 mm of width and an elongation percentage at breakage of not smaller than 50% when the tension speed is 0.2 m/min.

Japanese Unexamined Patent Publication (Kokai) No. 7-138540 discloses an application film for a marking sheet having an adhesive layer formed on one surface of a base member of a thermoplastic resin and is used for applying a marking sheet, wherein the base member is more flexible than the marking sheet and has rich rubbery elasticity. Desirably, the base material of the application film is a soft vinyl chloride resin. Besides, the film desirably has a 10% modulus of 1.5 to 2.5 g/25 mm of width, a maximum elongation of 150 to 300% and a thickness of 50 to 100 $\mu$m. The adhesive layer has a thickness of 10 to 20 $\mu$m.

In recent years, however, it has been desired to stick the marking film onto ever steeply curved portions in the field of armoring such as, fuel tanks of motorcycles, fenders, etc. However, such requirements cannot be sufficiently met by the application films disclosed in the above-mentioned Unexamined Patent Publications. That is, on the portions of complex shapes such as fuel tanks, fenders, etc., the sticking operation must be carefully carried out so that wrinkles will not develop and air bubbles will not be entrapped, particularly, as the areas of such portions increase, resulting in a great decrease in the sticking operation efficiency, In order to improve the efficiency of sticking operation, it can be contrived to decrease the thickness of the marking film to cope with to various curved shapes or, in other words, to enhance the "ability for tracing curved surfaces". However, such a thin film is likely to be damaged during the work and, besides, loses the so-called "stiffness", deteriorating the workability, causing the positioning to become complex and often permitting the films to be adhered to each other during the work. Moreover, despite the operation is carefully done, wrinkles develop and air bubbles are inevitably entrapped. Besides, due to a complex shape of a portion where the film is to be stuck, the marking film after stuck is often damaged despite it was carefully stuck.

Moreover, in order to further improve the ornamental appeal or to protect the marking film applied to the article from being rubbed or peeled, an over-clear coating is often applied onto the marking film. Here, a problem stems from a step formed at the end of the film. When the marking film is thick, air bubbles are entrapped in the stepped portions to deteriorate appearance. Or, it often becomes necessary to stick the marking film all over again.

SUMMARY OF THE INVENTION

The present invention provides an improved marking film that is free from one or more of the above-mentioned problems inherent in the prior art. The present marking film can be transferred and adhered onto articles having rugged surfaces and steeply curved three-dimensional surfaces favorably and with ease. The present marking film does not cause the appearance to be deteriorated that stems from the entrapping of air bubbles at the ends of the film.

According to one aspect of the present invention, there is provided a marking film having a marking component to be transferred onto an article via an adhesive layer, wherein a total thickness of the marking film is in the range of from about 50 $\mu$m to about 300 $\mu$m, and the modulus of elasticity thereof is in the range of from about 2 kgf/mm$^2$ to about 25 kgf/mm$^2$ as measured under a condition where the marking film is elongated at a tension speed of 300 mm/min. into an elongation percentage in the range of from 0 to about 10%.

According to another aspect of the present invention, there is provided a composite marking film comprising a marking film having a marking component to be transferred onto an article via an adhesive layer, and an application film used as a transfer-assisting member when the marking film is to be transferred onto the article, wherein the modulus of elasticity of the composite marking film is in the range of from about 2 kgf/mm$^2$ to about 28 kgf/mm$^2$ as measured under a condition where the composite marking film is elongated at a tension speed of 300 mm/min. into an elongation percentage in the range of from 0 to about 10%.

The present inventors have conducted study in an attempt to solve the problems of the conventional application films or of the marking films used in combination therewith, as described above in the Background section, have discovered the fact that the problems can be solved upon improving the marking film rather than the application film and, particularly, upon improving the properties of the marking film, and have thus completed the marking film of the present invention.

As a result of the study conducted thus far, the study group of the present inventors has accomplished an application film as disclosed in, for example, Japanese Unexamined Patent Publication (Kokai) No. 10-287849. This application film is used as an intermediate transfer member when the marking member is to be adhered onto the article, and comprises a base member and an adhesive layer formed on one surface of the base member and can be adhered to the marking member, the base member having a 10% modulus strength of from 0.3 to 1.6 kgf/25 mm, a 10% modulus stress of from 0.1 to 0.8 kgf/mm$^2$, a 100% modulus stress of from 0.7 to 2.5 kgf/mm$^2$, and a rate of change in the modulus stress of not smaller than 0.3 when measured at a tension speed of 200 mm/min. in compliance with the standards stipulated under Japanese Industrial Standard (JIS)-K7127.

Owing to particular properties of the base member that is used, the application film exhibits flexibility, rubbery elasticity and stiffness which are well balanced, and can be advantageously used as an intermediate transfer member at the time when the marking member is to be adhered, particularly, onto steeply curved three-dimensional surfaces of the articles. In using the application film, the inventors have forwarded the study concerning which marking member or, in other words, which marking film would be effective when the article has steeply curved three-dimensional surfaces, and have discovered that the marking member having suitable degrees of flexibility and rubbery elasticity is desirable. According to the present invention, the thickness and the modulus of elasticity at an elongation percentage of from 0 to 10% of the marking film are limited to lie within particular ranges, making it possible to improve the ability for tracing the three-dimensional curved surfaces. Even when the marking film is accompanied by the application film, the modulus of elasticity of the whole film at an elongation percentage of from 0 to 10% is limited to lie within a particular range to obtain the same effect. In addition, according to the present invention, the degree of ability for tracing the curved surfaces can be easily estimated from a formula of a primary function as will be described later in detail. Upon imposing limitation on the thickness of the marking film, furthermore, the over-clear coating can be applied without causing any trouble after the marking film has been stuck. According to the application film disclosed in the above-mentioned Japanese Unexamined Patent Publication (Kokai) No. 7-138540, it is essential to use a hard marking sheet having flexibility and rubbery elasticity inferior to those of the application film, which is contrary to those of the present invention.

Besides, the present inventors have discovered that the application film used in combination therewith plays an important role of maximizing the excellent action and effect exhibited by the marking film, and have completed the composite marking film of the present invention to obtain excellent effect stemming from the combination of the two films.

DETAILED DESCRIPTION

Figure 1:
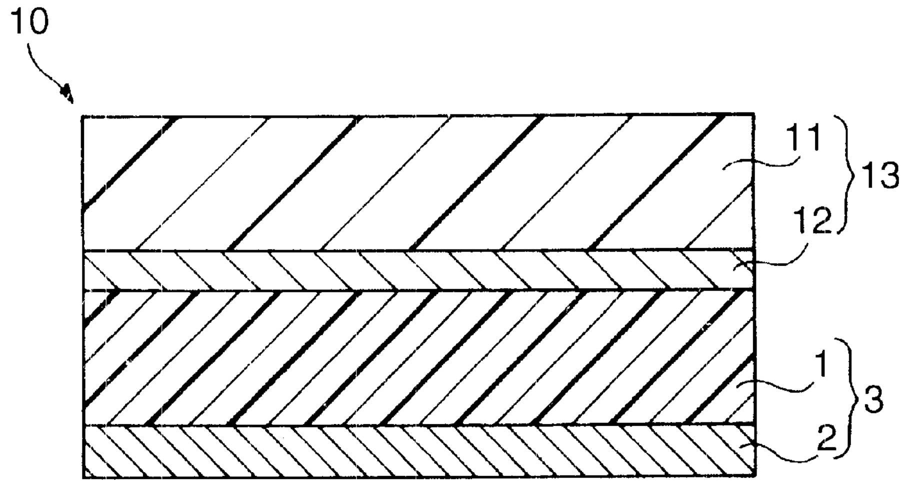
FIG. 1 is a sectional view illustrating a preferred marking film and a preferred composite marking film according to the present invention.

FIG. 1 is a sectional view illustrating a preferred marking film according to the present invention and a preferred composite marking film including the marking film. For easy comprehension, this view illustrates the films on an enlarged scale.

A marking film 3 comprises a base member 1 and an adhesive layer 2 formed on one surface of the base member 1 and can be adhered to an article (not shown). Though not illustrated, it is desired that the surface of the adhesive layer 2 is provided with a peeling paper to protect the layer until it is applied to the article, as is widely done in this field of art.

In the practice of the present invention, the marking film 3 has a total thickness (sum of the thicknesses of the base member 1 and the adhesive layer 2, or inclusive of the thickness of any additional layer) of from 50 to 300 $\mu$m. The marking film 3 has a modulus of elasticity in a range of from 2 to 25 kgf/mm$^2$ as measured under a condition where the marking film is elongated at a tension speed of 300 mm/min. into an elongation percentage of from 0 to 10%.

A composite marking film 10 is constituted by the marking film 3 and an application film 13 in combination. As shown, the application film 13 is constituted by a base member 11 and an adhesive layer 12 formed on one surface of the base member 11 and can be adhered onto the base member 1 of the marking film 3. In a step prior to forming the composite marking film 10 in combination with the marking film 3, it is desired that the application film 13 is provided with a peeling paper applied onto the surface of the adhesive layer 12, as is generally done in this field of art. This is to avoid undesired adhesion with each other or with any other material when the application film 13 is to be preserved in the form of a roll or in any other form, or is to be stuck to the marking film 3.

The composite marking film 10 of the present invention has a modulus of elasticity in a range of from 2 to 28 kgf/mm$^2$ as measured under a condition where the composite marking film is elongated at a tension speed of 300 mm/min. into an elongation percentage of from 0 to 10%. It is desired that the composite marking film 10 has a thickness (total thickness of the marking film 3 and the application film 13, inclusive of the thickness of any additional layer) of from 110 to 350 $\mu$m.

The operation for adhering the above-mentioned marking film or the composite marking film onto an article is carried out according to a procedure that will be described below.

First, an application film comprising a base member and an adhesive layer is prepared. Next, a marking film comprising an ornamental film (base member) having an adhesive layer and a peeling paper applied to the side of the adhesive layer is prepared. The application film is stuck to the surface of the marking film without having the adhesive layer in order to form a composite marking film of the present invention comprising the marking film and the application film as a unitary structure.

Figure 2:
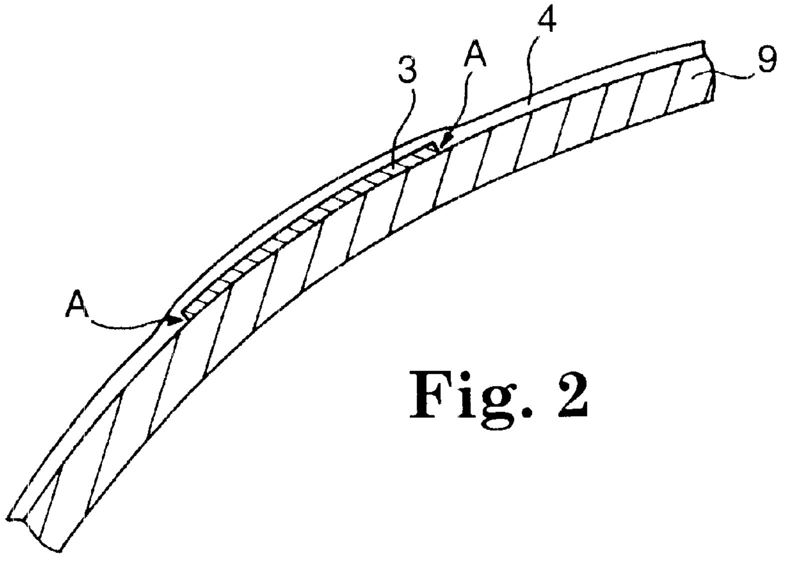
FIG. 2 is a sectional view illustrating an example where the marking film of the invention is stuck to an article having a curved surface and an over-clear coating is further applied thereon.

Next, the composite marking film is positioned on a predetermined portion of an article in a manner that the application film is on the upper side and is adhered via the adhesive layer of the ornamental film. According to the present invention, the composite marking film can be intimately adhered onto the surface of the article without developing wrinkles or entrapping air bubbles. After the composite marking film has been adhered, the application film is peeled off the ornamental film of the marking film adhered onto the article. As a result, the ornamental film (marking film) 3 is obtained being intimately adhered onto the curved surface of the article 9 as shown in FIG. 2 which further illustrates an over-clear coating 4 that is subsequently applied. In this case, the occurrence of inconvenience such as entrapping of air bubbles has been prevented at an end of the ornamental film 3 indicated by an arrow A.

In the practice of the present invention, no particular limitation is imposed on the base members used for the marking film and the application film, provided the base members have flexibility required by the present invention. Suitable examples of the base member include soft vinyl chloride resin, urethane resin, polyolefin resin and polyester resin and, preferably, soft vinyl chloride resin and urethane resin, though the base member is not necessarily limited thereto only. The base members may be constituted by a single kind of the resin, or a laminated layer structure may be constituted by using two or more kinds of resins in combination.

The thicknesses of the base members can be widely changed depending upon the desired effect but must satisfy the above-mentioned requirements of thicknesses. As for the marking film, when no over-clear coating has been applied, the thickness of the base material is from 50 to 300 μm and, more desirably, from 50 to 250 μm inclusive of the thickness of the adhesive layer applied to the base member. When the thickness of the base member becomes smaller than 50 μm, the marking film loses stiffness, and the film as a whole becomes too soft when the parting paper is peeled off the marking film prior to being used. If desired, the thickness of the base member of the marking film may exceed the upper limit of the above-mentioned range.

Furthermore, the properties of the base member used for the marking film play an important role. That is, the base member used for the marking film must have a modulus of elasticity of from 2 to 25 $kgf/mm^2$ and, more preferably, from 2 to 5 $kgf/mm^2$ as measured under particular elongation conditions, i.e., as measured under a condition where the marking film is elongated at a tension speed of 300 mm/min. into an elongation percentage of from 0 to 10%. When the modulus of elasticity of the base member becomes larger than 25 $kgf/mm^2$, the flexibility becomes insufficient and the ability for tracing the three-dimensional curved surfaces is deteriorated. When the modulus of elasticity of the base member becomes smaller than 2 $kgf/mm^2$, on the other hand, the rubbery elasticity becomes insufficient, and wrinkles develop on the outer periphery of the marking film. It is desired that the base member has a maximum elongation of not smaller than 200% so that the application film used in combination therewith can be elongated to a sufficient degree.

Similarly, an important role is played by the thickness and properties of the marking film accompanied by the application film, i.e., of the composite marking film. That is, it is desired that the composite marking film has a thickness of from 110 to 350 μm and, more preferably, from 180 to 300 μm. When the thickness of the composite marking film becomes smaller than 110 μm, there occurs inconvenience such as lack of stiffness of the composite marking film. When the thickness of the composite marking film becomes larger than 350 μm, on the other hand, the stress increases too much in the film, and the ability for tracing the curved surfaces and the operability are deteriorated.

It is essential that the composite marking film has a modulus of elasticity of from 2 to 28 $kgf/mm^2$ and, more preferably, from 4 to 14 $kgf/mm^2$ as measured under the same elongation conditions as those for the above-mentioned marking film. When the modulus of elasticity of the base member becomes larger than 28 $kgf/mm^2$, the flexibility is lost and ability for tracing the three-dimensional curved surfaces is deteriorated. When the modulus of elasticity of the base member becomes smaller than 2 $kgf/mm^2$, on the other hand, the rubbery elasticity becomes insufficient and wrinkles easily develop when the composite marking film is adhered to the article. It is desired that the application film used for the composite marking film has a maximum elongation of not smaller than 200% so that the marking film can be elongated to a sufficient degree depending upon a variety kinds of articles.

Concerning the evaluation of ability for tracing the curved surfaces, furthermore, the present inventors have discovered, through experiment, that it can be easily judged which combination of the marking film and the application film, i.e., which composite marking film would offer satisfactory ability for tracing the curved surfaces without really sticking the film.

A number of marking films and application films are prepared and are arbitrarily combined together to prepare marking films accompanied by an application film, i.e., to prepare composite marking films. The area of a reference composite marking film is denoted by "1", and ratios of areas of the sample composite marking films thereto (referred to as "area ratios") f(x) and moduli of elasticity (x) of the composite marking films are found for each of the composite marking films. Then, relationships between the moduli of elasticity and the area ratios are plotted on a graph for each of the composite marking films, and it is learned that there exists a relationship represented by a primary regression curve between them as expressed by the following formula (1), $$f(x)=-0.076x+4.13$$

Here, favorable ability for tracing the curved surfaces is obtained when f(x) is 2 or larger and, more preferably, when f(x) is 3 or larger.

When the thickness of the application film is denoted by t1, modulus of elasticity thereof by m1, thickness of the marking film by t2 and the modulus of elasticity thereof by m2, the modulus of elasticity (x) of the composite marking film can be expressed by the following formula (2), $$x=m1\times t1/(t1+t2)+m2\times t2/(t1+t2)$$

Thus, the composite marking film of which combination would offer excellent ability for tracing the curved surfaces can be judged easily, precisely and highly reliably provided the thicknesses and moduli of elasticity of the marking film and the application film have been known without the need of conducting the evaluation testing by really sticking the marking films. The fact that it is made possible to evaluate the degree of ability for tracing the three-dimensional curved surfaces is an innovative discovery.

There is no particular limitation on the adhesive layer applied onto one surface or, as required, onto both surfaces of the base members of the marking film and the application film. Therefore, any adhesive agent can be used as is generally done in this field of art to form the adhesive layer maintaining any desired thickness relying upon an application method that is customarily used. Suitable examples of the adhesive agent may include an acrylic adhesive agent comprising, chiefly, a butyl acrylate that has heretofore been used, a rubber-type adhesive agent comprising, chiefly, a styrene-butadiene rubber (SBR) and the like, an urethane-type adhesive agent, a silicone-type adhesive agent, a vinyl acetate-type adhesive agent, and the like agents. The thickness of the adhesive layer formed by applying these adhesive agents can be widely changed but is, usually, in a range of from 10 to 40 μm and, more preferably, from 15 to 30 μm.

The adhesive strengths of the adhesive layers, i.e., the adhesive strength of the application film relative to the marking film and the adhesive strength of the marking film relative to the article, can be suitably selected by taking into consideration a variety of factors such as base materials, materials of the marking film and the application film, and environment in which the sticking operation is carried out. The adhesive strength of the application film relative to the marking film is generally over a range of from 10 to 800 gf/25 mm as measured in compliance with the standards stipulated under JIS-Z0237. In the final step of operation, the application film must be peeled off the marking film. Therefore, the adhesive strength must not be larger than the adhesive strength of the marking film relative to the article. Preferably, furthermore, the adhesive strength of the marking film relative to the article is in a range of from 0.5 to 4.0 kgf/25 mm as measured in compliance with the standards stipulated under JIS-Z0237.

As briefly described earlier, it is desired that the adhesive layers of the application film and the marking film are protected by parting papers until these films are used. There is no particular limitation on the parting papers used here, and it is allowed to use any parting paper that has generally been used in this field of art. Suitable examples of the peeling paper include woven or nonwoven fabric, paper, or plastic sheet that has been treated so as to be parted. Furthermore, suitable examples of the parting agent include a silicone-type parting agent and the like agent.

In general, the marking film is applied with a coloring layer containing an ink to produce ornamental appeal or with a transparent resin layer (so-called clear layer) in order to impart luster or to improve adhesiveness of the over-clear coating. In this case, too, any kind of ink or transparent resin can be used provided it has properties lying within ranges contemplated by the present invention. Suitable examples of the ink include those of the urethane type, acrylic type and vinyl chloride type. Suitable examples of the transparent resin include those of the urethane type, acrylic type and fluorine type. There is no particular limitation on the thicknesses of the coloring layer and the clear layer. Generally, however, the thicknesses of these layers lie in a range of from 5 to 40 $\mu$m and, more preferably, in a range of from 5 to 20 $\mu$m.

The marking film can be used in such applications as being stuck to a fuel tank of a motorcycle having a three-dimensional curved surface. After the marking film is stuck, in this case, the surface of the fuel tank inclusive of the marking film may often be covered with the over-clear coating. The over-clear coating works to protect the marking film from being peeled off or rubbed and to further improve the ornamental appeal. Here, when the marking film is too thick, air bubbles are entrapped at the ends of the film impairing the appearance. When the over-clear coating is applied, therefore, it is desired that the thickness of the marking film is not larger than 120 $\mu$m and, more preferably, not larger than 100 $\mu$m.

EXAMPLES

The invention will now be described by way of working examples. Here, however, it should be noted that the invention is in no way limited to these examples only.

Example 1

Two kinds of application films AP1 and AP2 were prepared according to the procedure described below.

Application Film 1 (AP1):

Application tape "Tape #331 (production lot No. 33080326)" having a base member of a vinyl chloride resin film that is commercially available from Sumitomo 3M Co. The base member of this film is the one prepared by adding 33 parts by weight of dioctyl phthalate (as a plasticizer) and 2 parts by weight of an epoxylated soybean oil (as a stabilizer) to 100 parts by weight of a vinyl chloride resin, and subjecting the mixture into the calender molding so as to acquire a thickness of 68 $\mu$m. The adhesive layer is formed by uniformly applying an acrylic adhesive agent comprising chiefly a butyl acrylate onto one surface of the base member maintaining a thickness of 7 $\mu$m.

Application Film 2 (AP2):

Commercially available under the trade name "SCT1010J" from Sumitomo 3M Co.; Prepared by adding 33 Parts by weight of dioctyl phthalate (as a plasticizer), 15 parts by weight of a polyester-type plasticizer and 2 parts by weight of an epoxylated soybean oil (as a stabilizer) to 100 parts by weight of a vinyl chloride resin. The obtained mixture was calender-molded to prepare a vinyl chloride resin film having a thickness of 100 $\mu$m. Then, an acrylic adhesive agent comprising chiefly a butyl acrylate was uniformly applied maintaining a thickness of 15 $\mu$m onto one surface of the obtained vinyl chloride resin film.

Example 2

Five kinds of marking films MK1, MK2, MK3, MK4 and MK5 were prepared according to the procedure described below.

Marking Film 1 (MK1):

"Scotchcal™ 3650" film commercially available from Sumitomo 3M Co. This marking film uses a relatively hard soft vinyl chloride resin as a base member and has a thickness of 50 $\mu$m. The adhesive layer is formed by uniformly applying an acrylic adhesive comprising chiefly a 2-methylbutyl acrylate maintaining a thickness of 30 $\mu$m onto one surface of the base member.

Marking Film 2 (MK2):

"Scotchcal™ CS-206 F02" film commercially available from Sumitomo 3M Co. This marking film uses a slightly flexible soft vinyl chloride resin as a base member and has a thickness of 106 $\mu$m. The adhesive layer is formed by uniformly applying an acrylic adhesive comprising chiefly a 2-methylbutyl acrylate maintaining a thickness of 35 $\mu$m onto one surface of the base member.

Marking Film 3 (MK3):

"Scotchcal™ OT-305W" film commercially available from Sumitomo 3M Co. This marking film uses a flexible soft urethane resin as a base member and has a thickness of 30 $\mu$m. The adhesive layer is formed by uniformly applying an acrylic adhesive comprising chiefly a butyl acrylate maintaining a thickness of 20 $\mu$m onto one surface of the base member.

Marking Film 4 (MK4):

"Scotchcal™ PU-295T" film commercially available from Sumitomo 3M Co. This marking film uses a soft and rubbery elastic urethane resin as a base member and has a thickness of 140 $\mu$m. The adhesive layer is formed by uniformly applying an acrylic adhesive comprising chiefly a butyl acrylate maintaining a thickness of 40 $\mu$m onto one surface of the base member.

Marking Film 5 (MK5):

Commercially available under the trade name "GMW8000J" from Sumitomo 3M Co.; Prepared by adding 0.9 Equivalents of an isophoron diisocyanate and 0.2 equivalents of a hexamethylene diisocyanate to a polycarbonate-type polyol (OHV=14.7) to prepare a coating solution. The thus obtained coating solution was formed into a thin film by bar coating and were heated and cured. There was obtained a rubbery elastic urethane resin film having a thickness of 70 μm. Then, an acrylic adhesive comprising chiefly a butyl acrylate was uniformly applied maintaining a thickness of 30 μm onto one surface of the obtained urethane resin film.

Example 3

In order to evaluate the properties of the marking film and the composite marking film of the present invention, experiments were conducted according to a procedure described below. The moduli of elasticity of the films were measured under a condition where the films were elongated at a tension speed of 300 mm/min into an elongation percentage of 0 to 10%.

Experiment 1

The application films prepared in Example 1 were stuck to the marking films prepared in Example 2 and were intimately adhered thereto to a sufficient degree. The films were combined together in a manner as shown in Table 1. The obtained composite marking films were cut into circles having diameters of from 50 to 150 mm maintaining a difference of 10 mm relative to one another. Peeling papers of the marking films were peeled off the circular films, and the marking films were stuck to spheres (made of an acrylic resin) having a diameter of 150 mm by using a squeegee. It became difficult to stick the circular films onto the spheres as the diameter of the circular films increased. Table 1 shows critical points (maximum diameters of the circular films that can be stuck) at where the operation efficiency for sticking the circular films of the composite marking films decreases and wrinkles start developing together with the area ratios of when the area of a reference composite marking film (combination of AP1 and MK1) is set to be “1”. Table 1 further shows moduli of elasticity measured from the composite marking films.

TABLE 1

| application film | marking film | max. diameter (mm) | area ratio | elasticity ($kgf/mm^2$) |
|---|---|---|---|---|
| AP1 | MK1 | 60 | 1 | 46 |
| AP1 | MK2 | 70 | 1.36 | 25.1 |
| AP1 | MK3 | 80 | 1.78 | 35.6 |
| AP1 | MK4 | 110 | 3.36 | 11.8 |
| AP1 | MK5 | 100 | 2.78 | 17.9 |
| AP2 | MK1 | 80 | 1.78 | 28.1 |
| AP2 | MK2 | 100 | 2.78 | 17.1 |
| AP2 | MK3 | 90 | 2.25 | 20.5 |
| AP2 | MK4 | 120 | 4 | 5.8 |
| AP2 | MK5 | 120 | 4 | 5.1 |

As will be obvious from the results of Table 1, use of the marking film and the composite marking film of the present invention makes it possible to improve the operation for sticking the marking film and to prevent the occurrence of defects such as wrinkles compared with when the conventional marking films are used.

Figure 3:
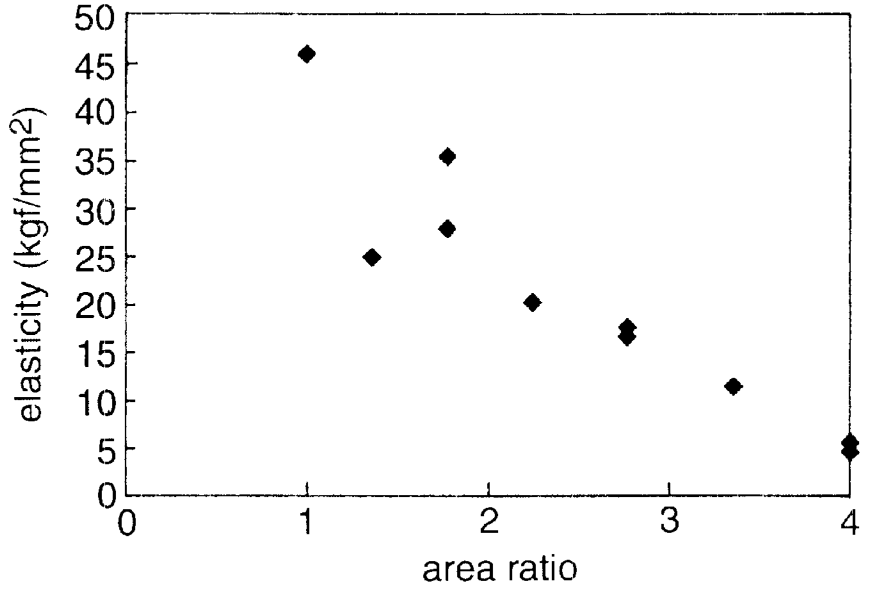
FIG. 3 is a graph plotting the relationships between the area ratios and the moduli of elasticity of the composite marking films.

From the results of Table 1, furthermore, a graph shown in FIG. 3 is obtained by plotting relationships between the area ratios and the moduli of elasticity. From these results, the relationships between the area ratios and the moduli of elasticity can be expressed by a primary function as given by the following formula (1), $$f(x)=-0.076x+4.13$$

where f(x) is a ratio of the area of a reference composite marking film that is regarded to be “1” to the area of a sample composite marking film, and x is a modulus of elasticity of a composite marking film. This formula makes it possible to judge the composite marking film of which combination will offer excellent ability for tracing the curved surfaces easily, highly precisely and highly reliably provided the thicknesses and the moduli of elasticity of the marking film and the application film have been known without conducting the evaluation testing by really sticking the marking film.

Figure 4:
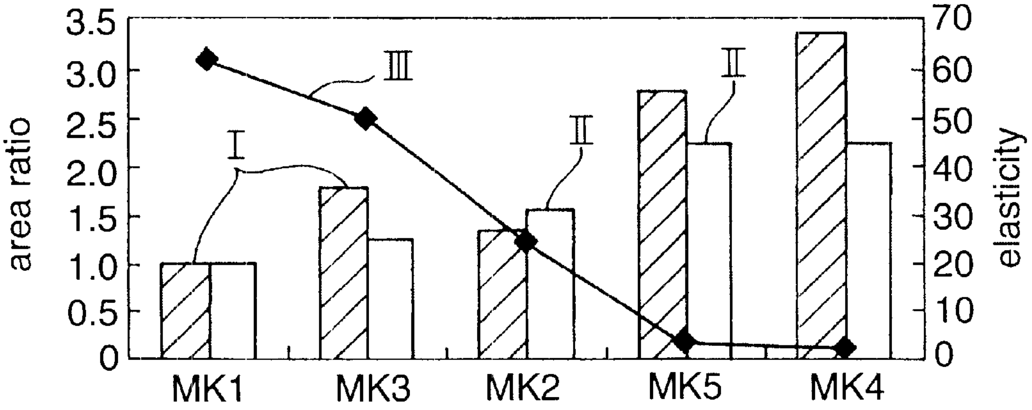
FIG. 4 is a graph plotting the relationships among the combinations of the composite marking films, the area ratios and the moduli of elasticity.

Based upon the results of Table 1, furthermore, the inventors have rearranged the relationships between the moduli of elasticity and the area ratios of the marking films concerning different composite marking films (combinations of marking films and application films), and have obtained the results as shown in Table 2 and a graph as plotted in FIG. 4. In FIG. 4, graphs I represent area ratios of when AP1 is used, graphs II represent area ratios of when AP2 is used, and a graph III represents the modulus of elasticity.

TABLE 2

| marking film | area ratio (using AP1) | area ratio (using AP2) | elasticity ($kgf/mm^2$) |
|---|---|---|---|
| MK1 | 1 | 1 | 62.06 |
| MK3 | 1.78 | 1.26 | 50.38 |
| MK2 | 1.36 | 1.56 | 24.71 |
| MK5 | 2.78 | 2.25 | 3.37 |
| MK4 | 3.36 | 2.25 | 2.47 |

From these results, it will be understood that the area of the marking film of the present invention that can be stuck increases with a decrease in the modulus of elasticity of the marking film irrespective of the kind of the application film.

Experiment 2

The procedure of the above Experiment 1 was repeated. In this experiment, however, the moduli of elasticity of the application films and the marking films as well as the moduli of elasticity of the composite marking films were measured as shown in Table 3. Furthermore, the moduli of elasticity (x) of the composite marking films were calculated in compliance with the following formula (2), $$x=m\mathbf{1}\times t\mathbf{1}/(t\mathbf{1}+t\mathbf{2})+m\mathbf{2}\times t\mathbf{2}/(t\mathbf{1}+t\mathbf{2})$$

Figure 5:
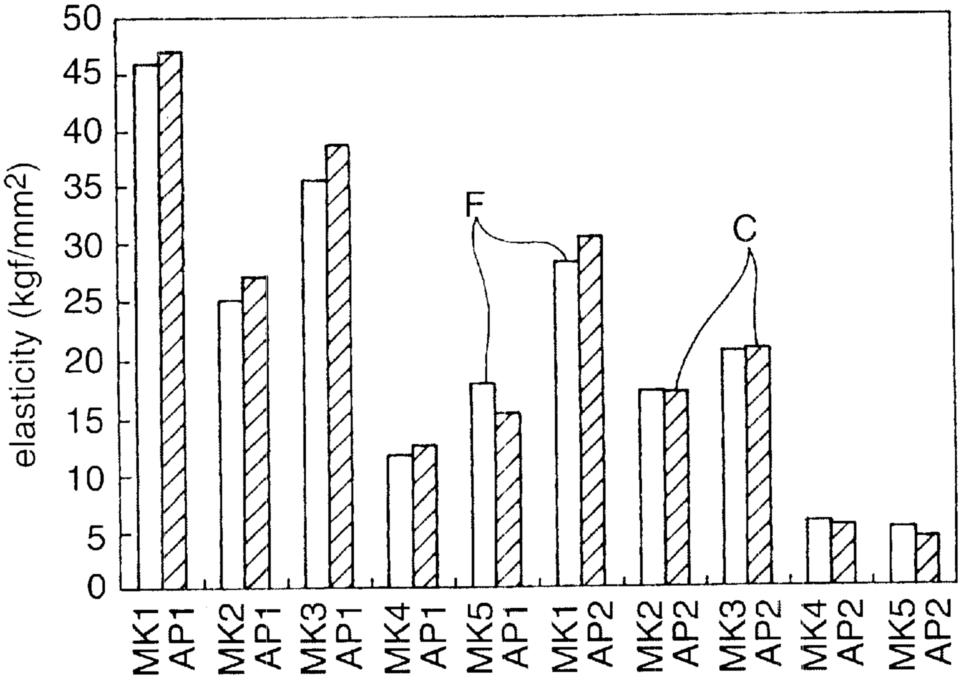
FIG. 5 is a graph plotting the relationships between the combinations of the composite marking films and the moduli of elasticity.

In the above formula, t1 is the thickness of the application film, m1 is the modulus of elasticity thereof, t2 is the thickness of the marking film and m2 is the modulus of elasticity thereof. The measured results and the calculated results are shown in Table 3 and in FIG. 5. In FIG. 5, F denotes measured moduli of elasticity and C denotes calculated moduli of elasticity.

TABLE 3

| application film | marking elasticity of application film | marking film | elasticity of marking film | elasticity ($kgf/mm^2$) found | elasticity ($kgf/mm^2$) calculated |
|---|---|---|---|---|---|
| AP1 | 30.89 | MK1 | 62.06 | 46 | 47 |
| AP1 | 30.89 | MK2 | 24.71 | 25.1 | 26.9 |
| AP1 | 30.89 | MK3 | 50.38 | 35.6 | 38.7 |
| AP1 | 30.89 | MK4 | 2.47 | 11.8 | 12.6 |
| AP1 | 30.89 | MK5 | 3.37 | 17.9 | 15.2 |
| AP2 | 7.07 | MK1 | 62.06 | 28.1 | 30.2 |
| AP2 | 7.07 | MK2 | 24.71 | 17.1 | 17 |
| AP2 | 7.07 | MK3 | 50.38 | 20.5 | 20.6 |
| AP2 | 7.07 | MK4 | 2.47 | 5.8 | 5.3 |
| AP2 | 7.07 | MK5 | 3.37 | 5.1 | 4.2 |

From these results, it can be understood that in the case of the composite marking films of the present invention, the ability for tracing the curved surfaces can be estimated provided the moduli of elasticity and thicknesses of the application films and the marking films have been known without the need of really combining the two films together to prepare composite marking films and without really sticking the composite marking films.

Experiment 3

Experiment was conducted according to the following procedure in order to evaluate the adaptability of the over-clear coating to the marking film of when the over-clear coating is applied onto the marking film.

As an article (base member to which the marking film is to be stuck), there was provided a plate coated with melamine white of Paltech Co. The marking films MK1 to MK5 (measuring 50 mm×50 mm) prepared in Example 2 above were stuck onto the articles together with the application film AP1 prepared in Example 1 above with pressure. A squeegee was used to assist the sticking operation.

After the sticking operation has been completed, the application film AP1 was peeled off the marking films which were then left to stand at room temperature for 48 hours. Then, the over-clear coating material (a blend of "Beamcoat No. 1500 Clear HM" and a high-urethane curing agent "HL-M" manufactured by Nippon Yushi Co. at a ratio of 5:1) was sprayed onto the whole article inclusive of the surface of the marking film so as to form a film having a dry thickness of 60 pin followed by drying. After the over-clear coating has been applied, the appearance of the marking films was observed by eyes, and the results were obtained as shown in Table 4.

TABLE 4

| marking film | film thickness (μm) | appearance |
|---|---|---|
| MK3 | 50 | no problem |
| MK1 | 80 | no problem |
| MK5 | 100 | no problem |
| MK2 | 140 | bubbles in film edge |
| MK4 | 180 | bubbles in film edge |

From the results of Table 4, it will be understood that air bubbles are entrapped to deteriorate the appearance of the over-clear coating when the thickness of the marking film becomes great.

As described above, the marking film of the present invention can be easily stuck even onto rugged portions or steeply curved three-dimensional surfaces such as fuel tanks, fenders, etc. without accompanied by defects such as occurrence of wrinkles or entrapping of air bubbles, maintaining very favorable operation efficiency. Even when the over-clear coating is applied after the marking film has been stuck, there does not occur such inconvenience as entrapping of air bubbles at the ends of the film. Moreover, the composite marking film of the present invention which is stiff can be stuck favorably facilitating the positioning operation and avoiding such an inconvenience that the films adhere together during the operation. Furthermore, the composite marking film of the present invention avoids the probability of being damaged after it has been stuck.

What is claimed is:

1. A composite marking film for transferring a marking component to an article, comprising:

an application film comprising a first base member and a first pressure sensitive adhesive layer on an outer surface of the first base member; and a marking film having a first outermost surface temporarily adhered to the first adhesive layer of the application film, wherein the marking film comprises a second base member and a second pressure sensitive adhesive layer on an outer surface of the second base member, wherein the second pressure sensitive adhesive layer forms a second outermost surface of the marking film;

wherein the composite marking film has a modulus of elasticity in the range of from about 2 $kgf/mm^2$ to about 28 $kgf/mm^2$ as measured under a condition where the composite marking film is elongated at a tension speed of 300 mm/min. into an elongation percentage in the range of from 0 to about 10%, and wherein the marking film alone has a modulus of elasticity in the range of from about 2 $kgf/mm^2$ to about 25 $kgf/mm^2$ as measured under a condition where the composite marking film is elongated at a tension speed of 300 mm/min, into an elongation percentage in the range of from 0 to about 10%, wherein said first base member comprises vinyl chloride resin; said second base member comprises vinyl chloride resin or urethane resin; said first adhesive layer comprises a butyl acrylate; and said second adhesive layer comprises a butyl acrylate or a 2-methylbutyl acrylate.

2. The composite marking film according to claim 1, wherein the composite marking film has an overall thickness in the range of from about 110 μm to about 350 μm.

3. The composite marking film according to claim 1 in combination with an article, wherein said composite marking film is adhered to said article via said second pressure sensitive adhesive layer.

4. The composite marking film according to claim 3, wherein said composite marking film is adhered onto a rugged portion or steeply curved three-dimensional surface of said article.

5. The composite marking film according to claim 1, wherein the adhesive strength of the second pressure sensitive adhesive layer is from 0.5 to 4.0 kgf/25 mm, and the adhesive strength of the first pressure sensitive adhesive layer is from 10 to 800 gf/25 mm.

6. The composite marking film according to claim 3, wherein said article comprises a motorcycle fuel tank or a fender.

7. The composite marking film according to claim 1, wherein said second base member has a maximum elongation of at least 200%.

8. The composite marking film according to claim 1, wherein said marking film has a total thickness in the range of from about 50 μm to about 300 μm.

9. The composite marking film according to claim 1, further comprising a release liner on the second pressure sensitive adhesive layer.

10. The composite marking film according to claim 1, wherein an adhesive strength of the second pressure sensitive adhesive layer is greater than an adhesive strength of the first pressure sensitive adhesive layer.

* * * * *

UNITED STATES PATENT AND TRADEMARK OFFICE

CERTIFICATE OF CORRECTION

PATENT NO. : 6,673,419 B1
DATED : January 6, 2004
INVENTOR(S) : Mori, Yutaka

It is certified that error appears in the above-identified patent and that said Letters Patent is hereby corrected as shown below:

Title page,
Item [57], ABSTRACT,
Line 8, delete "A" following "the";

Column 1,
Line 58, delete "," following "efficiency", insert in place thereof -- . --;
Line 61, delete "to", following "with";

Column 6,
Line 5, insert -- of -- following "variety";

Column 10,
Line 53, Table 3, second column, delete "marking" preceding "elasticity";

Column 11,
Line 27, delete "pin", insert in place thereof -- $\mu$m --.

Signed and Sealed this

Eighteenth Day of May, 2004

JON W. DUDAS
*Acting Director of the United States Patent and Trademark Office*